United States Patent
Boersma et al.

(10) Patent No.: US 10,169,046 B2
(45) Date of Patent: Jan. 1, 2019

(54) OUT-OF-ORDER PROCESSOR THAT AVOIDS DEADLOCK IN PROCESSING QUEUES BY DESIGNATING A MOST FAVORED INSTRUCTION

(71) Applicant: International Business Machines Corporation, Armonk, NY (US)

(72) Inventors: Maarten J. Boersma, Holzgerlingen (DE); Robert A. Cordes, Austin, TX (US); David A. Hrusecky, Cedar Park, TX (US); Jennifer L. Molnar, Cedar Park, TX (US); Brian W. Thompto, Austin, TX (US); Albert J. Van Norstrand, Jr., Round Rock, TX (US); Kenneth L. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/693,387

(22) Filed: Aug. 31, 2017

(65) Prior Publication Data
US 2018/0121205 A1 May 3, 2018

Related U.S. Application Data (63) Continuation of application No. 15/338,691, filed on Oct. 31, 2016, now Pat. No. 9,798,549.

(51) Int. Cl.
G06F 9/38 (2018.01)
G06F 9/30 (2018.01)
G06F 9/52 (2006.01)
G06F 12/0875 (2016.01)

(52) U.S. Cl.
CPC ........ *G06F 9/3855* (2013.01); *G06F 9/3005* (2013.01); *G06F 9/3009* (2013.01); *G06F 9/30043* (2013.01); *G06F 9/3802* (2013.01); *G06F 9/3836* (2013.01); *G06F 9/3851* (2013.01); *G06F 9/524* (2013.01); *G06F 12/0875* (2013.01); *G06F 2212/452* (2013.01)

(58) Field of Classification Search
CPC ........................... G06F 9/3851; G06F 9/3855
See application file for complete search history.

(56) References Cited

U.S. PATENT DOCUMENTS

| | | |
|---|---|---|
| 5,692,170 A | 11/1997 | Isaman |
| 6,237,081 B1 | 5/2001 | Le et al. |
| 6,543,002 B1 | 4/2003 | Kahle et al. |
| 6,785,803 B1 | 8/2004 | Merchant et al. |
| 7,484,131 B2 | 1/2009 | Fields, Jr. et al. |
| 8,239,661 B2 | 8/2012 | Abernathy et al. |

(Continued)

OTHER PUBLICATIONS

Boersma et al., "Out-Of-Order Processor That Avoids Deadlock in Processing Queues by Designating a Most Favored Instruction" U.S. Appl. No. 15/338,691, filed Oct. 31, 2016, 27 pages.

(Continued)

*Primary Examiner* — Jyoti Mehta
(74) *Attorney, Agent, or Firm* — Martin & Associates, LLC; Derek P. Martin (57) ABSTRACT

An instruction sequencing unit in an out-of-order (OOO) processor includes a Most Favored Instruction (MFI) mechanism that designates an instruction as an MFI. The processing queues in the processor identify when they contain the MFI, and assures processing the MFI. The MFI remains the MFI until it is completed or is flushed, and which time the MFI mechanism selects the next MFI.

12 Claims, 7 Drawing Sheets

(56) References Cited

U.S. PATENT DOCUMENTS

| | | |
|---|---|---|
| 8,276,149 B2 | 9/2012 | Burns et al. |
| 2004/0215933 A1 | 10/2004 | Nguyen et al. |
| 2008/0016254 A1 | 1/2008 | Kruger et al. |
| 2014/0282575 A1 | 9/2014 | Chan |
| 2016/0092225 A1 | 3/2016 | Collura et al. |

OTHER PUBLICATIONS

Appendix P—List of IBM Patents or Patent Applications Treated As Related, dated Sep. 27, 2017, 2 pages.

Jew, Earl, "The IBM Power8 Processor Core Microarchitecture", a white paper summary with thoughts and considerations, summary of article by the same title in IBM Journal of Research and Development, vol. 59 No. 1 Paper 2, Jan./Feb. 2015 (Feb. 18, 2016), 126 pages.

Michaud et al., "Data-flow Prescheduling for Large Instruction Windows in Out-of-Order Processors", 7th Int'l Conference on High Performance Computer Architecture, Jan. 2001, 11 pages, [retrieved from the internet on Feb. 18, 2017], retrieved from URL <www.irisa.fr/alf/downloads/michaud/hpca7.pdf>.

OUT-OF-ORDER PROCESSOR THAT AVOIDS DEADLOCK IN PROCESSING QUEUES BY DESIGNATING A MOST FAVORED INSTRUCTION

BACKGROUND

1. Technical Field

This disclosure generally relates to processors, and more specifically relates to out-of-order (OOO) processors.

2. Background Art

Processor architectures have become very sophisticated. Out-of-order (OOO) processors include multiple instruction execution pipelines and processing queues that process multiple instructions in parallel. An instruction sequencing unit in an OOO processor takes dispatched instructions and checks their dependencies to see if all older instructions with respect to a current instruction have delivered, or may predictably soon deliver, results of these older instructions that are needed before the current instruction can execute properly. When all dependencies have been satisfied, the instruction is ready to issue, and is issued as soon as possible, even when the instruction occurs in the code after other instructions that are still being processed. Because instructions can be issued out of order when compared to their order in the computer program, this type of processor is referred to in the art as an out-of-order (OOO) processor.

OOO processors typically include a deadlock counter, which is sometimes referred to as a "hang buster", to break the processor out of a lockup condition that is preventing instructions from issuing. The hang buster typically operates based on a threshold value for a count of processor cycles. When the count of processor cycles exceeds the threshold value without any instruction issuing, the hang buster knows something in the instruction execution logic is locked up. Thus, the hang buster flushes one or more processing queues in the processor, which allows the processor to reload the processing queues and continue processing. Flushing one or more processing queues in the processor is a drastic measure, because all the benefits of parallel processing of instructions and out-of-order execution of instructions is momentarily lost until the processing queues are reloaded. As a result, the threshold value for a hang buster is typically set to a relatively high value, such as 30,000 processor cycles. Thus, in the prior art, if some high number of processor cycles pass without an instruction issuing, the hang buster flushes one or more processing queues to eliminate the conditions that caused the processing queues to lock up. At this point, processing of instructions continues, but resolving this lock condition did not happen until the high number of processor cycles passed. In addition, parallel and OOO execution will not continue until the processing queues are reloaded, which takes a significant period of time. The result is that when a lockup condition occurs in a OOO processor that prevents instructions from issuing, a severe performance penalty is paid to eliminate the lockup condition.

BRIEF SUMMARY

An instruction sequencing unit in an out-of-order (OOO) processor includes a Most Favored Instruction (MFI) mechanism that designates an instruction as an MFI. The processing queues in the processor identify when they contain the MFI, and may give priority to processing the MFI. The MFI remains the MFI until it is completed or is flushed, and which time the MFI mechanism selects the next MFI. The MFI information is transmitted to processing queues via an Itag bus, communicating the MFI information at the same time instruction status information is sent to the processing queues on the Itag bus, thereby communicating the MFI information to the processing queues using very little overhead.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

An instruction sequencing unit in an out-of-order (OOO) processor includes a Most Favored Instruction (MFI) mechanism that designates an instruction as an MFI. The processing queues in the processor identify when they contain the MFI, and may give priority to processing the MFI. The MFI remains the MFI until it is completed or is flushed, and which time the MFI mechanism selects the next MFI. The MFI information is transmitted to processing queues via an Itag bus, communicating the MFI information at the same time instruction status information is sent to the processing queues on the Itag bus, thereby communicating the MFI information to the processing queues using very little overhead.

Figure 1:
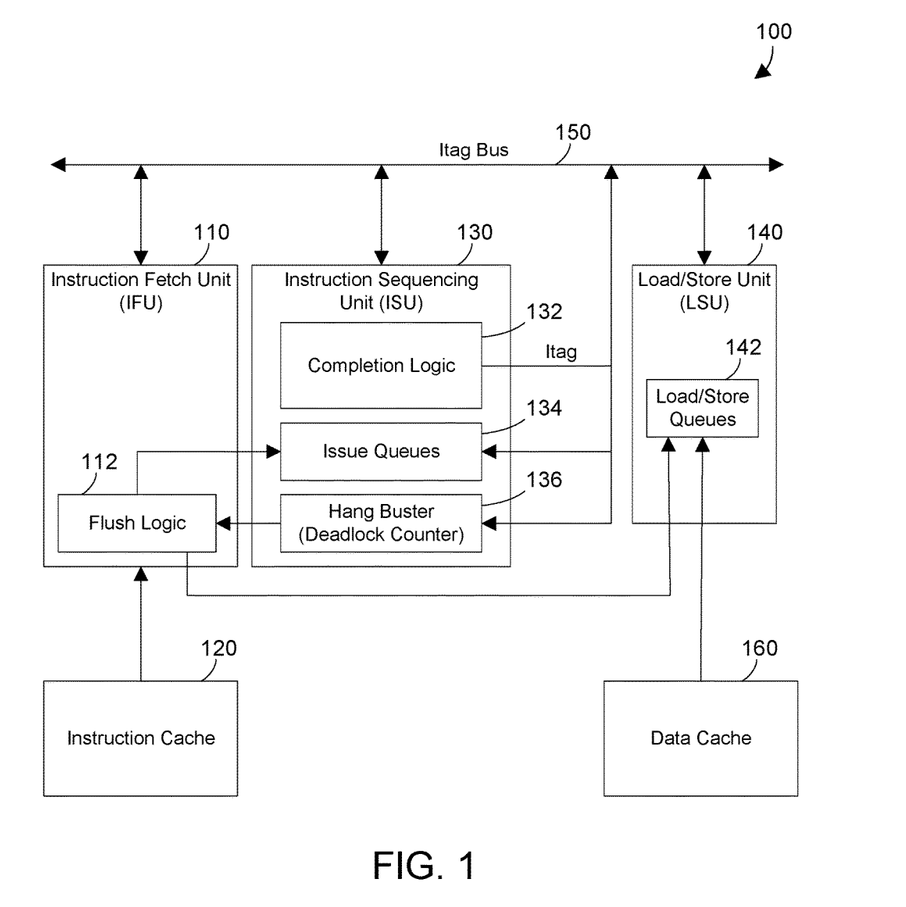
FIG. 1 is a block diagram of a portion of an out-of-order (OOO) processor.

Referring to FIG. 1, a portion of an out-of-order (OOO) processor 100 is shown, which includes an instruction fetch unit 110, an instruction cache 120, an instruction sequencing unit 130, a load/store unit 140, and a data cache 160. The instruction fetch unit 110 reads instructions from the instruction cache 120, decodes these instructions, and prepares the instruction to be dispatched forward to where the instructions may execute. In addition, the instruction fetch unit 110 can decode complex operations into two or more reduced instruction set computer (RISC) operations. The instruction fetch unit 110 typically includes branch prediction logic that determines which instructions to read from the instruction cache 120.

The instruction sequencing unit 130 takes dispatched instructions from the IFU 110 and checks their dependencies to see if all older instructions with respect to a current instruction have delivered, or may predictably soon deliver, results of these older instructions that are needed before this current instruction can execute properly. When all dependencies are satisfied, the instruction is ready to issue, and is issued by the instruction sequencing unit 130 to the issue queues 134 as soon as possible, regardless of program order of instructions. The completion logic 132 generates an Itag, which is an aging identifier that is applied to an instruction so that forward processes may be able to determine the original program order of one instruction relative to another. The Itag preferably indicates instruction status information to the plurality of processing queues for a single instruction corresponding to the Itag. The units and/or processing queues receiving the instruction, such as the load/store unit 140, may not be able to handle the instruction immediately due to a variety of reasons, and the instruction sequencing unit 130 may have to keep the instruction in its queue until such a time when the load/store unit 140 may be better able to handle the instruction, at which point it is issued to the issue queues 134 again. After the instruction is issued to the issue queues 134, the instruction sequencing unit 130 watches the progress of the instruction by getting and recording status such that it can know when the executing unit or processing queues are finished providing a result, and that the program order of finishing has now resolved itself such that the results are indistinguishable from what an In-Order machine would have produced and can be committed to an architectural state of completion. At this point the programmer views that his instructions are "completing" in order. Once reaching completion, the instruction sequencing unit 130 broadcasts out this completion event on the Itag bus 150, from which the receiving units and processing queues can determine how to "dispose" of the already completed instruction(s).

Processor 100 in FIG. 1 may include many different execution pipelines and many different processing queues that are not shown in FIG. 1. One skilled in the art will appreciate that an OOO processor will have a relatively large number of processing queues that are not explicitly shown in FIG. 1. For example, in the load store unit 140 alone, which is the unit responsible for fetch and storing data to a local memory (L1) and lower levels of hierarchical memory (L2 and beyond) the following processing queues may be included in the load/store queues 142: load reorder queue, which stockpiles rejected instructions; store reorder queue, which also stockpiles rejected instructions, and hold store instruction awaiting completion; translation miss fetching queue; load miss fetching queue (to L2 and beyond); and load store addressing queue, which stockpiles issued instructions that arrive in too bursty of a manner at the load/store unit 140. Of course, there may be many other processing queues to suit different design styles.

The ISU 130 includes a "hang buster" 136, which is typically a deadlock counter that counts processor cycles without instructions being issued. When a predetermined threshold number of processor cycles pass without instructions being issued, the hang buster knows there is a lock condition in one or more of the processing queues, so it issues a command to flush logic 112 in the IFU 110. The flush logic 112 can flush one or more processing queues, which may include the issues queues 134 in the ISU 130, along with the load/store queues 142 in the LSU 140. Once the load/store queues 142 are flushed and one or more instruction process queues are flushed, the processor 100 begins loading the instruction process queues and load/store queues 142 anew, and execution continues. As discussed in the Background section, the threshold value for the hang buster is typically set quite high, because the performance penalty for the hang buster eliminating a lock condition by instructing the flush logic to flush one or more processing queues is severe, so the hang buster 136 should only take action when it is certain a lock condition has occurred.

The load store unit (LSU) 140 retrieves data from the memory hierarchy, beginning with a local data cache 160 and extending as far down in the hierarchy as needed to find the requested data, and places the data in load/store queues 142 that are comprised of one or more processor registers. The LSU 140 also stores data from the processor registers into the data cache 160 as needed. The LSU 140 also handles the Effective Address to Real Address translations as required to communicate with lower levels of hierarchical memory below the data cache 160, which are not shown in FIG. 1. Once an instruction in determined to be completed, the LSU 140 can drop its record of the load in the load/store queues 142, and/or can now drain the entries in the load/store queues 142 with data to the proper location in the data cache 160 or farther down in hierarchical memory.

Figure 2:
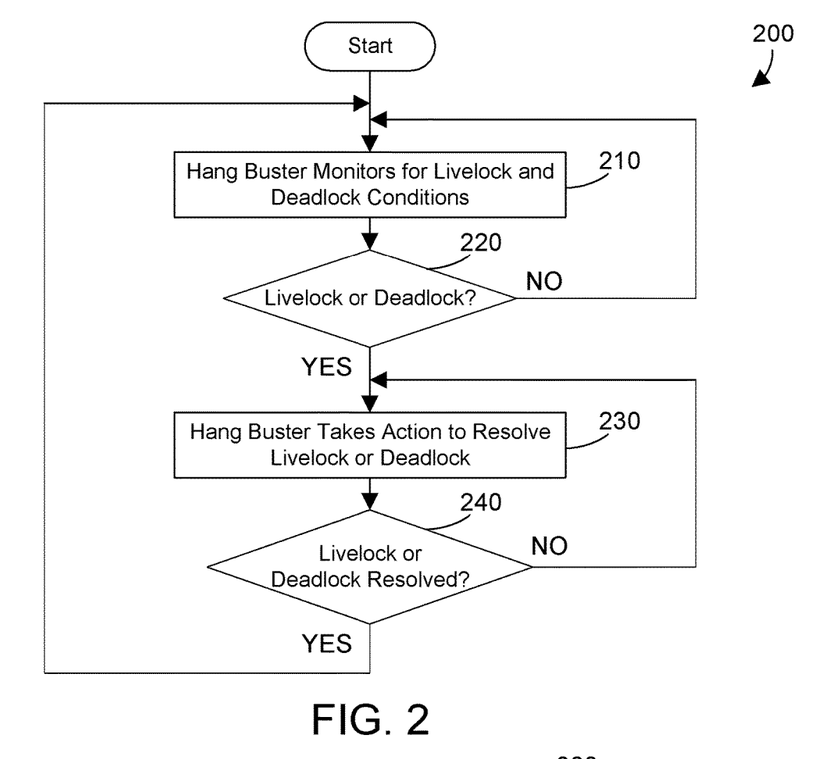
FIG. 2 is a flow diagram of a method for the hang buster in FIG. 1 to monitor and resolve livelock and deadlock conditions in the processor in FIG. 1.

Referring to FIG. 2, a method 200 is preferably performed by the hang buster 136 shown in FIG. 1. The hang buster monitors instruction execution queues for livelock and deadlock conditions (step 210). Livelock and deadlock conditions in processing queues in an OOO processor are well-known in the art, and therefore are not discussed further herein. As long as no livelock or deadlock exists (step 220=NO), method 200 loops back to step 210 and continues monitoring. When a livelock or deadlock occur (step 220=YES), the hang buster takes action to resolve the livelock or deadlock (step 230). One way to determine when a livelock or deadlock occurs in step 220 is using threshold value for a deadlock counter, as discussed above. The action taken can include flushing the load/store queues 142, and flushing one or more processing queues. When the livelock or deadlock is not resolved (step 240=NO), method 200 loops back to step 230 and continues. Once the livelock or deadlock is resolved (step 240=YES), method 200 loops back to step 210 to continue monitoring for livelock and deadlock conditions. Note method 200 allows the hang buster to take an incremental approach, trying a less severe action to resolve a livelock or deadlock in step 230, and when the less severe action does not resolve the problem (step 240=NO), the hang buster can try a more severe action. Thus, the hang buster can have a hierarchy of resolution actions it could perform one at a time, from less severe to more severe, with the most severe flushing the load/store queues 142 and all the processing queues in processor 100.

Figure 3:
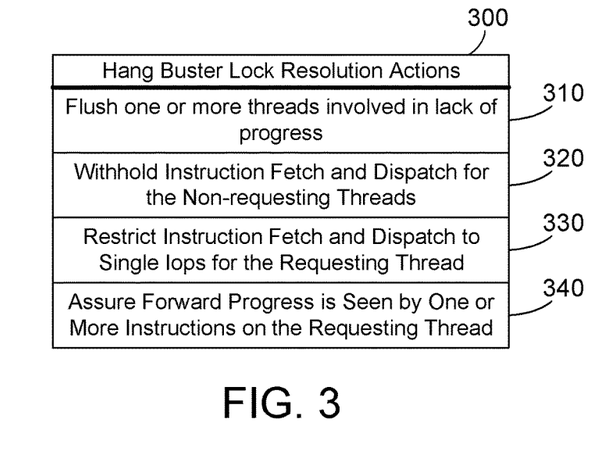
FIG. 3 is a table of sample lock resolution actions the hang buster could take in step 230 in FIG. 2.

FIG. 3 shows a table 300 with some examples of suitable lock resolution actions the hang buster can take in step 230 in FIG. 2. The hang buster can take these lock resolution actions shown in table 300 by instructing the flush logic 112 to perform certain functions. All the instructions in one or more threads involved in the lack of progress can be flushed, as shown at 310. Instruction fetch and dispatch can be withheld for the non-requesting threads, as shown at 320.

Instruction fetch and dispatch to single lops for the requesting thread can be restricted, as shown at 330. And assure forward progress is seen by one or more instructions on the requesting thread, as shown at 340. Note the resolution actions in table 300 are shown by way of example, and are not limiting. The hang buster can take any suitable action to resolve a livelock or deadlock within the scope of the disclosure and claims herein.

Figure 4:
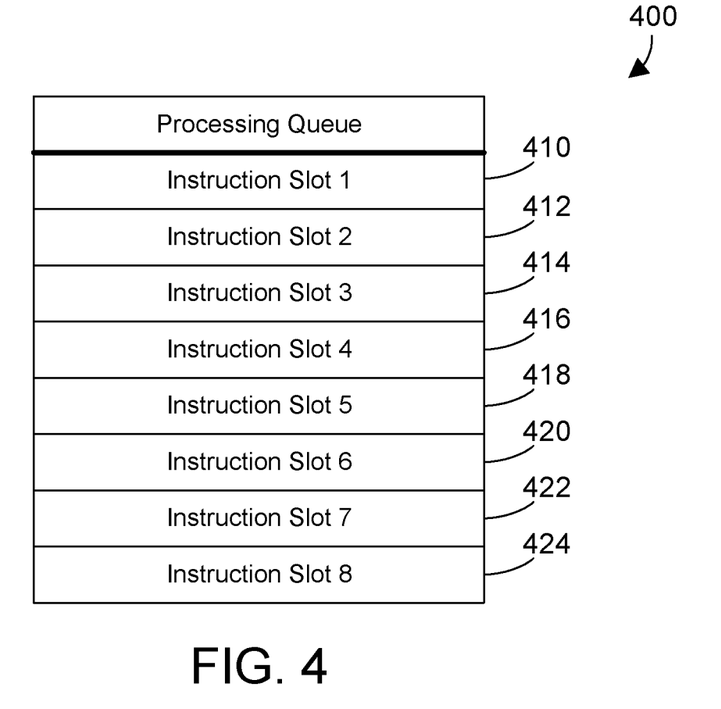
FIG. 4 is a block diagram of a processing queue in the processor in FIG. 1.

FIG. 4 shows a sample instruction processing queue 400 in processor 100 in FIG. 1, which could be representative of many different processing queues in processor 100. The instruction processing queue 400 includes eight instruction slots 410, 412, 414, 416, 418, 420, 422 and 424. These slots are used by the instruction processing queue 400 to hold instructions for processing by the processing queue 400.

Figure 5:
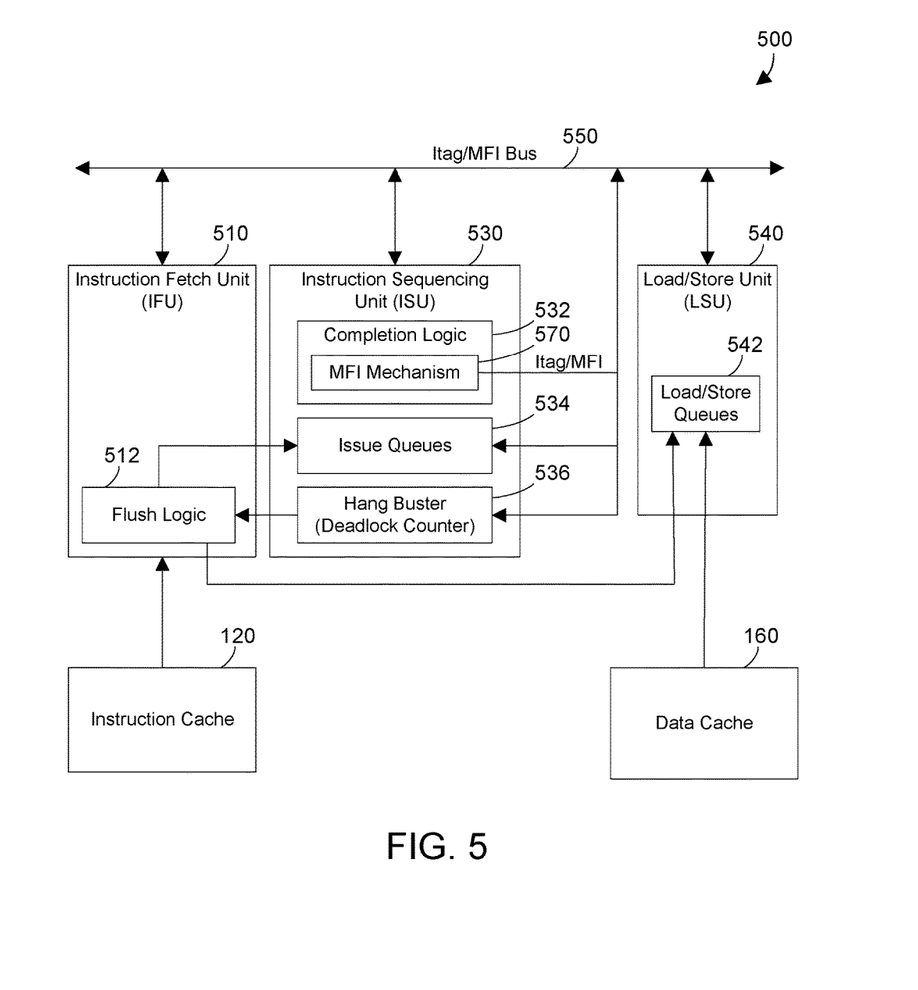
FIG. 5 is a block diagram of a portion of an out-of-order (OOO) processor that includes a Most Favored Instruction (MFI) mechanism.

Referring to FIG. 5, a processor 500 includes many components similar to those shown in FIG. 1. The instruction fetch unit 510 includes flush logic 512, similar to the IFU 110 and flush logic 112 shown in FIG. 1. The load/store unit 540 includes load/store queues 542, similar to the load/store unit 140 and the load/store queues 142 shown in FIG. 1. The ISU 530 includes issue queues 534 and a hang buster 536, similar to the issue queues 134 and hang buster 136 shown in FIG. 1. The completion logic 532 includes a most favored instruction (MFI) mechanism 570. The MFI mechanism 570 identifies an instruction as an MFI, and transmits this information to other processing queues via the Itag/MFI bus 550. The MFI mechanism 570 can transmit MFI information using very little overhead because an MFI flag can be transmitted at the same time an Itag is sent.

Transmitting MFI information on the Itag bus is very efficient and requires very little overhead. This is because at the same time an Itag is being broadcast to all to the processing queues in the standard way to describe the completion of an instruction represented by the Itag, with only one extra flag the MFI mechanism 570 can set that same Itag to the MFI state. Thus, no extra cycles are needed to be stolen from the completion broadcast to convey the MFI flag. However, the MFI mechanism 570 is free to interrupt this stream of completions to broadcast WI to any Itag it perceives as "stuck." At the same time an Itag is "stuck," the completion rate is probably somewhat retarded, leaving lots of available cycles to "steal" to broadcast the stuck MFI. In this way, the MFI mechanism not only can fix the clogging problems that arise in an OOO processor, but it can also help to keep it healthy by assuring at least one instruction has a clear path to completion all the time.

Figure 6:
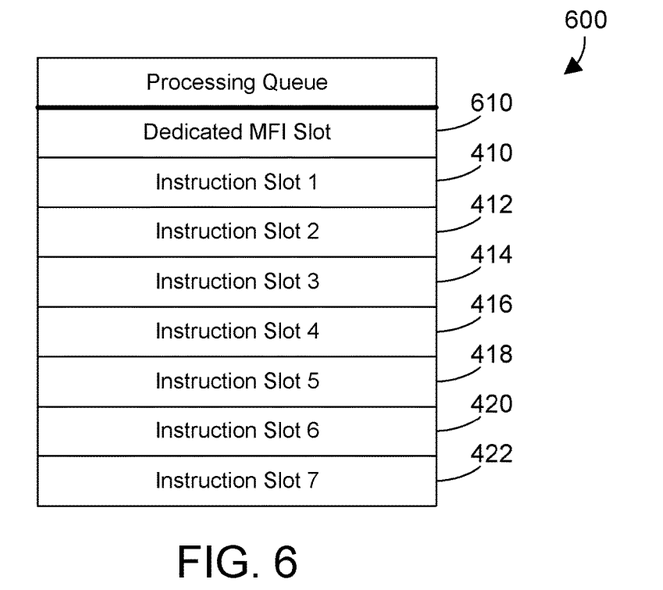
FIG. 6 is a block diagram of a processing queue in the processor in FIG. 5, which includes a dedicated MFI slot.

Referring to FIG. 6, an instruction processing queue 600 is representative of one or more processing queues in processor 500 shown in FIG. 5. Instruction processing queue 600 includes eight instruction slots, similar to the instruction processing queue 400 shown in FIG. 4. Note, however, one of the slots is a dedicated MFI slot 610, which the other slots 410, 412, 414, 416, 418, 420 and 422 are slots for other instructions that are not MFI at the time they are written to the slot. By providing a dedicated MFI slot 610 in an instruction processing queue 600, the instruction processing queue 600 will always have an available slot for processing the MFI. In the most preferred implementation, the dedicated slot 610 is shared with all operating threads. A processing queue that previously was seen to be full to any non-MFI (i.e., speculative) instruction and unable to make any progress to produce its results, now can allow the most critical instruction in the machine to progress through the processing queue. In this manner, long before a queuing system becomes deadlocked, this MFI mechanism 570 is in operation to prevent deadlocks.

It is known in the art to provide dedicated queue positions for each thread to assure that a particular instruction that is needed to make progress has a path thru a queue using the dedicated entry corresponding to the thread. The instruction chosen to be the user of this dedicated queue entry is always the instruction that is next to complete, the one needed to make immediate forward progress. In a multithreaded capable processor, for as many threads that are active in the processor, each thread will have one next co complete instruction. In the past, designers have allotted as many dedicated queue entries to the design to accommodate the same number of possible next to complete instructions, which corresponds to the maximum number of threads. Thus, when an instruction got to be next to complete status for a particular thread, it was allowed to use the thread-assigned dedicated slot in the queue it was headed into. For a machine that has a large number of threads capability, this could mean a lot of queue overhead to avoid hangs. The dedicated MFI slot 610 may be used by any thread, and thus provides a sort of "multiplex" into a single dedicated queue entry to service any thread that the MFI mechanism 570 has chosen.

Figure 7:
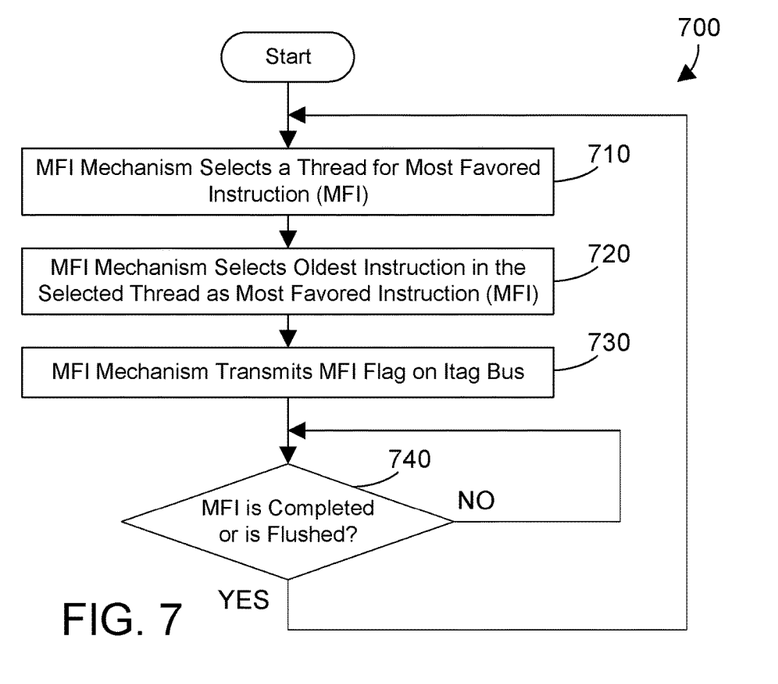
FIG. 7 is a flow diagram of a method for the MFI mechanism to select an MFI and communicate the MFI information to processing queues in the processor.

Referring to FIG. 7, a method 700 is preferably performed by the MFI mechanism 570 shown in FIG. 5. The MFI mechanism selects a thread for the most favored instruction (step 710). In one suitable implementation, the thread selected in step 710 is the thread with the oldest instruction. The MFI mechanism the selects the oldest instruction in the selected thread as the MFI (step 720). The oldest instruction selected in step 720 is preferably the next to complete instruction. The MFI mechanism then transmits the MFI flag on the Itag bus (step 730). Note the MFI Itag can be for an Itag for an instruction that has already been dispatched, or for an instruction at any point it its processing life. As long as the MFI has not completed or has not been flushed (step 740=NO), method 700 loops back and waits until the MFI is either completed or is flushed (step 740=YES). At this point method 700 loops back to step 710 to select the next MFI. Method 700 shows there is only one MFI at a time, thereby allowing all the processing queues to make sure the MFI is completed or is flushed, at which time the next MFI can be selected. Thus, the MFI mechanism 570 will not alter the MFI assignment until it can be sure the Itag involved has completed a full traversal from dispatch to execution to the completion logic 532, or in the alternative, the instruction that was the MFI has been flushed.

An instruction that is chosen to be the MFI partway through its life cycle does not have to realize its own MFI status immediately, nor be handled in preference to other instructions, to prevent hangs, as long as it is guaranteed that the instruction will eventually be selected by the processing queue to execute or flush. This allows the MFI mechanism 570 the freedom to use whatever time is deemed reasonable to transmit the MFI flag with an Itag, compare the MFI Itag to the Itags within the processing queue, mark one of the instructions as MFI, and then select the MFI for processing. Since heroic measures are not needed to force the MFI through as fast as possible, the processing queues can implement simpler selection functions and ones that allow non-MFI Itags that are in progress to finish, which can reduce disruption and thrashing between threads.

Figure 8:
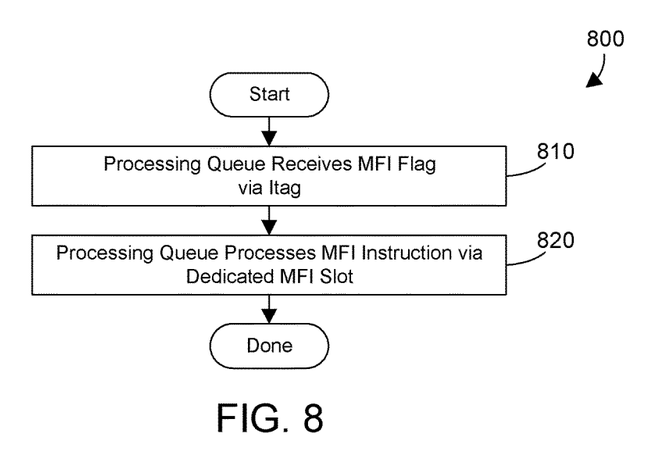
FIG. 8 is a flow diagram of a method for the processing queue with a dedicated MFI slot as shown in FIG. 6 to receive MFI information and to act on the received MFI information.

Referring to FIG. 8, a method 800 is preferably performed by a processing queue that has a dedicated MFI slot, such as processing queue 600 in FIG. 6 with its dedicated MFI slot 610. The processing queue receives the MFI flag via the Itag bus (step 810). The processing queue processes the MFI instruction via the dedicated MFI slot (step 820). Method 800 is then done. Note that method 800 assumes the processing queue has not yet received the MFI. If the MFI is already in one of the other instruction slots when the MFI flag is received, the processing queue can assure execution of the MFI in the existing instruction slot without moving the instruction to the MFI instruction slot. In a well-running system, a system that is not experiencing deadlocks, the MFI mechanism will be selecting instructions to assign MFI status, but will often find that the chosen instruction is well on its way thru the myriad of processing queues, nearing finish and completion stages. Most often, it will be the last queues in the processing path that will appreciate the function of the MFI design the most, where the arrival of the MFI flag via the Itag in step 810 arrives before the arrival of the MFI assigned instruction. The load/store queues 542 in the load/store unit 540, for example, are all at the tail end of the processing path. Thus, the dedicated MFI slot 610 will be used for the MFI instruction, which in turn uses one less of the normal queue entries that can be used in normal queue fashion for younger instructions or instructions from other threads. For queues that are designed to be small and fast, this is an efficiency that this MFI design strives to promote.

Figure 9:
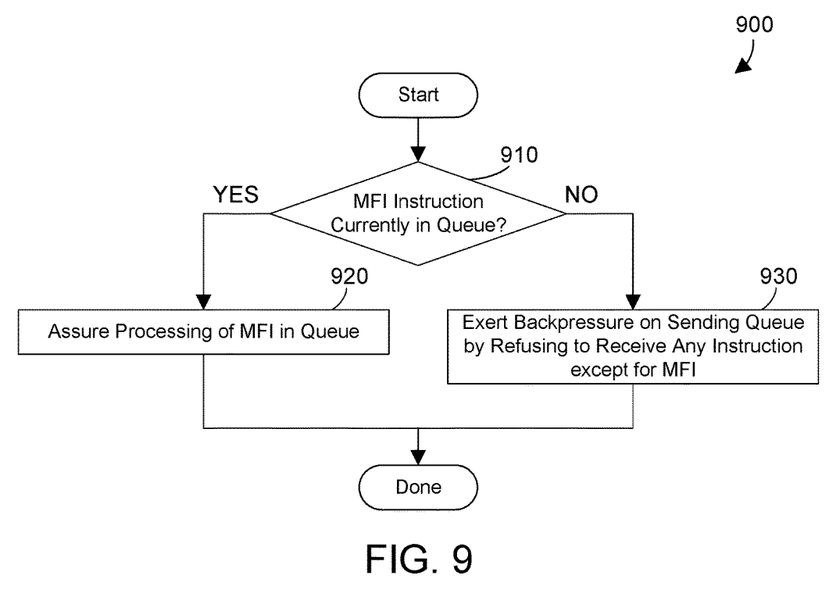
FIG. 9 is a flow diagram of a method for a processing queue that does not include a dedicated MFI slot, as shown in FIG. 4, to receive the MFI information and to act on the received MFI information.

Instead of providing a dedicated MFI slot in a processing queue as shown in FIG. 6, a processing queue without a dedicated MFI slot, such as processing queue 400 in FIG. 4, could be used. In this case, the action taken depends on whether the MFI is in the processing queue or not, as shown in method 900 in FIG. 9. When the MFI instruction is currently in the processing queue (step 910=YES), the processing queue can assure processing of the MFI (step 920). When the MFI instruction is not currently in the queue (step 910=NO), the processing queue exerts backpressure on the sending queue by refusing to receive any instruction from the sending queue except for the MFI (step 930). In this manner, the processing queue can assure the next instruction it accepts will be the MFI.

Figure 10:
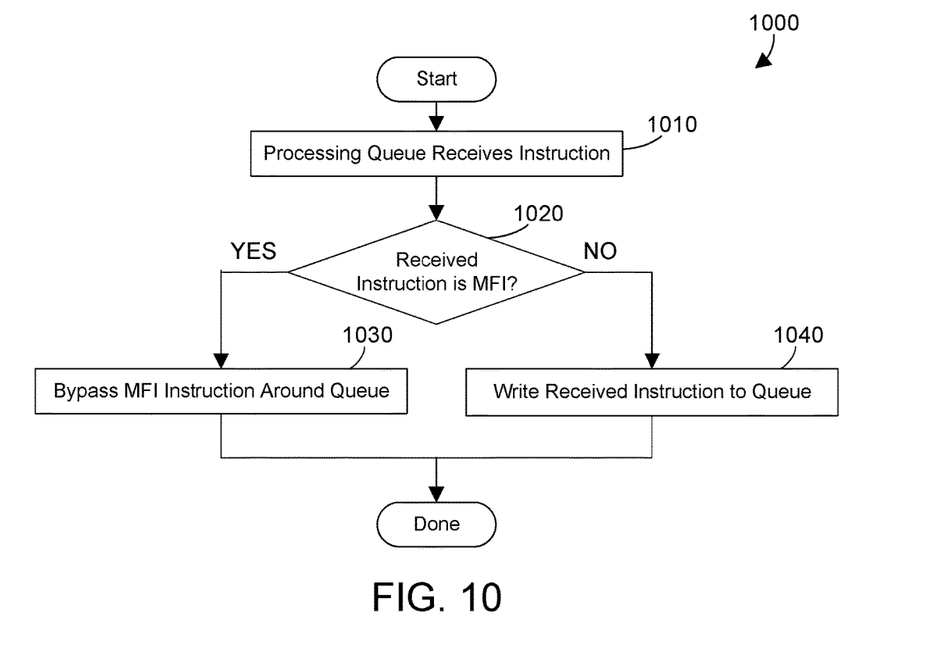
FIG. 10 is a flow diagram of a method for a processing queue that does not include a dedicated MFI slot, as shown in FIG. 4, to receive the MFI information and to act on the received MFI information by bypassing the MFI around the processing queue.

In an alternative implementation, the processing queue could use its instruction slots for non-MFI instructions, and could bypass its instruction slots for MFI instructions. Referring to FIG. 10, method 1000 begins when a processing queue receives an instruction (step 1010). When the received instruction is not the MFI (step 1020=NO), the received instruction is written to the processing queue (step 1040). When the received instruction is the MFI (step 1020=YES), the MFI instruction is bypassed around the processing queue (step 1030), which means the MFI is not stored in the processing queue. Method 1000 is then done.

The hang buster 536 in FIG. 5 can also function in conjunction with the MFI mechanism 570. In most scenarios, the MFI mechanism 570 will prevent lock conditions that can cause a processor to hang. However, the hang buster 536 may still be provided in addition to the MFI mechanism 570 so the hang buster 526 can take more drastic action to flush instructions and data should the threshold for the hang buster 536 ever be reached.

The claims and disclosure herein provide an instruction sequencing unit in an out-of-order (OOO) processor that includes a Most Favored Instruction (MFI) mechanism that designates an instruction as an MFI. The processing queues in the processor identify when they contain the MFI, and may give priority to processing the MFI. The MFI remains the MFI until it is completed or is flushed, and which time the MFI mechanism selects the next MFI. The MFI information is transmitted to processing queues via an Itag bus, communicating the MFI information at the same time instruction status information is sent to the processing queues on the Itag bus, thereby communicating the MFI information to the processing queues using very little overhead.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A processor for executing software instructions, the processor comprising:
a plurality of processing queues that process the software instructions and provide out-of-order processing of the software instructions when specified conditions are satisfied;
an instruction sequencing unit circuit that determines a sequence of the software instructions executed by the processor, wherein the instruction sequencing unit circuit comprises a most favored instruction circuit that selects an instruction as the most favored instruction (MFI) and communicates the MFI to the plurality of processing queues; and
wherein at least one of the plurality of processing queues comprises a plurality of slots that receive any instruction that is not the most favored instruction when written to one of the plurality of slots, and a dedicated slot for processing the MFI, wherein the dedicated slot cannot process any instruction that is not the MFI.

2. The processor of claim 1 wherein the most favored instruction circuit selects a thread and selects an oldest instruction in the selected thread as the most favored instruction.

3. The processor of claim 1 wherein the most favored instruction circuit communicates the MFI to the plurality of processing queues via a flag transmitted on an Itag bus with an Itag for the MFI.

4. The processor of claim 1 wherein, when the MFI is in one of the plurality of processing queues, the one processing queue assures processing of the MFI.

5. The processor of claim 1 further comprising:
a deadlock counter that detects when the processor has executed a number of cycles that exceeds a predetermined threshold value without issuing an instruction, and in response, flushes at least one of the plurality of processing queues.

6. The processor of claim 1 wherein, when the MFI is completed or is flushed, the most favored instruction circuit selects a next instruction as the MFI.

7. A method for executing software instructions in a computer program by a processor, the method comprising the steps of:
providing in the processor a plurality of processing queues that process the software instructions and provide out-of-order processing of the software instructions when specified conditions are satisfied;
providing an instruction sequencing unit circuit that determines a sequence of the software instructions executed by the processor, wherein the instruction sequencing unit circuit selects an instruction as the most favored instruction (MFI) and communicates the MFI to the plurality of processing queues;
providing a plurality of slots in at least one of the plurality of processing queues, wherein the plurality of slots receive any instruction that is not the most favored instruction when written to one of the plurality of slots; and providing a dedicated slot for processing the MFI in the at least one of the plurality of processing queues, wherein the dedicated slot cannot process any instruction that is not the MFI.

8. The method of claim 7 wherein the instruction sequencing unit circuit selecting an instruction as the most favored instruction comprises:

selecting a thread; and selecting an oldest instruction in the selected thread as the most favored instruction.

9. The method of claim 7 further comprising:

communicating the MFI to the plurality of processing queues via a flag transmitted on an Itag bus with an Itag for the MFI.

10. The method of claim 7 further comprising:

when the MFI is in one of the plurality of processing queues, the one processing queue assures processing of the MFI.

11. The method of claim 7 further comprising:

detecting when the processor has executed a number of cycles that exceeds a predetermined threshold value without issuing an instruction; and in response, flushing at least one of the plurality of processing queues.

12. The method of claim 7 further comprising:

when the MFI is completed or is flushed, selecting a next instruction as the MFI.

* * * * *